UNITED STATES PATENT OFFICE.

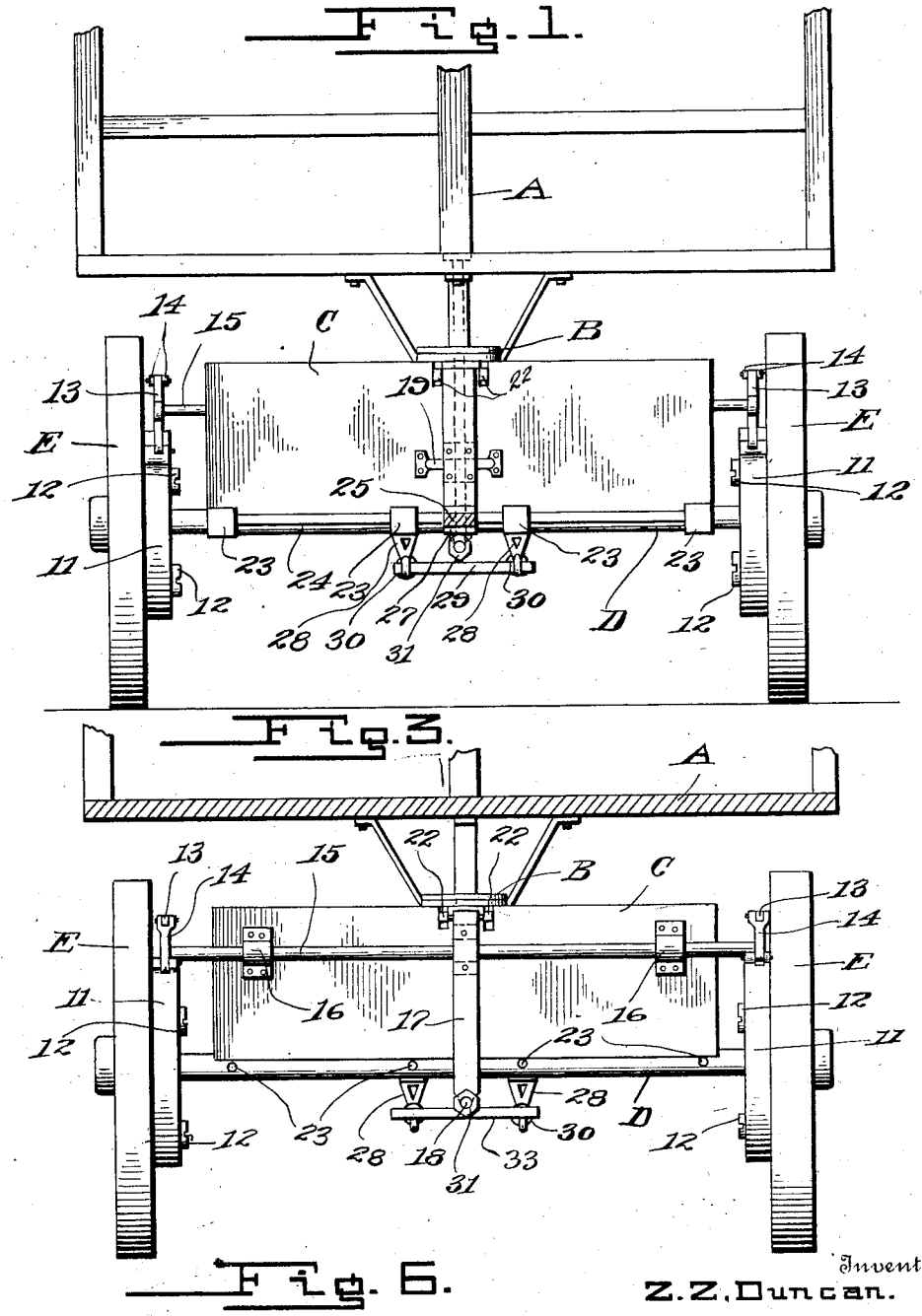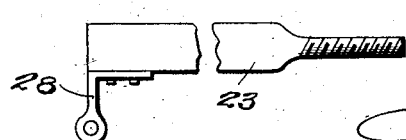

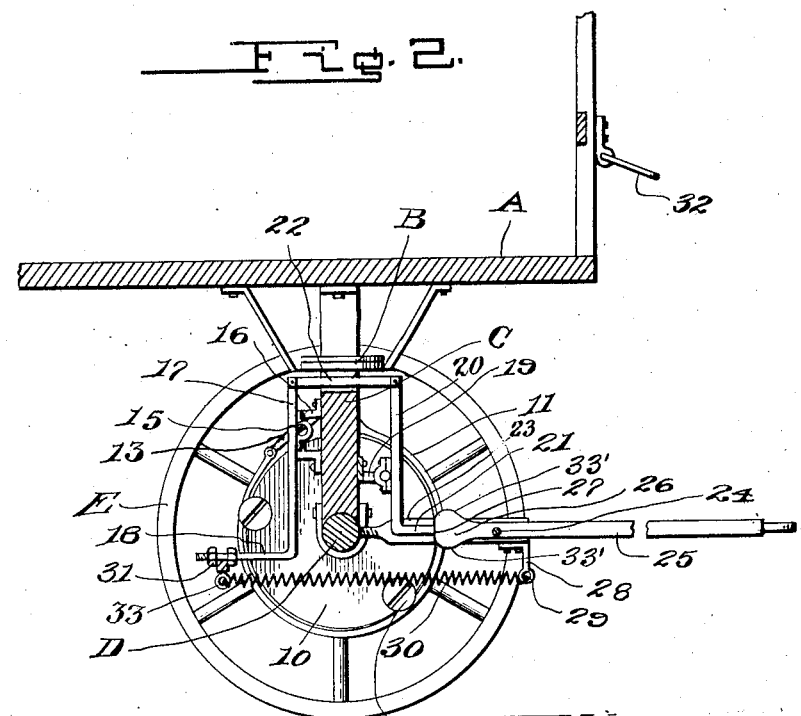
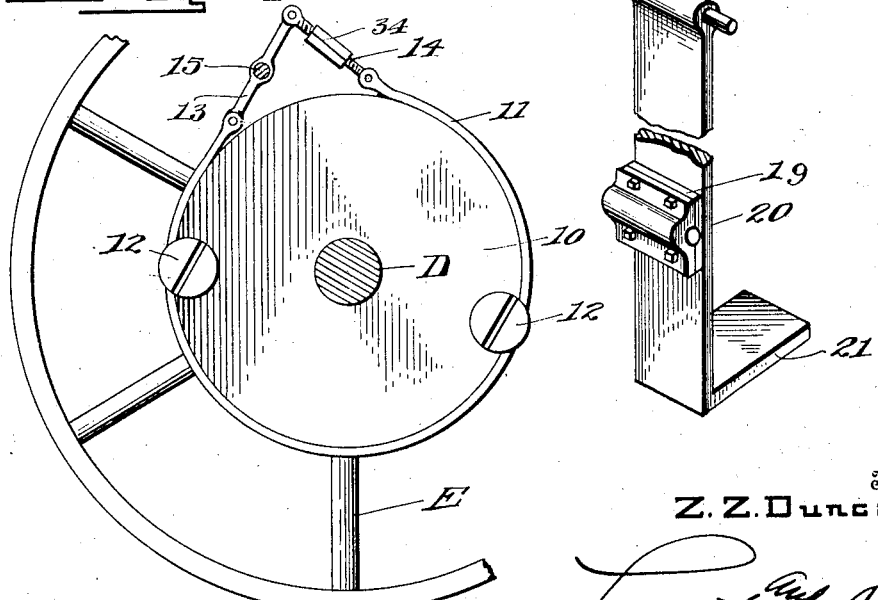

ZEONA ZEXTER DUNCAN, OF STANBERRY, MISSOURI, ASSIGNOR OF ONE-FOURTH TO DANA AMOS WOODS, OF STANBERRY, MISSOURI.

BRAKE FOR TRUCKS.

1,329,960.

Specification of Letters Patent.

Patented Feb. 3, 1920.

Application filed February 19, 1918. Serial No. 218,107.

*To all whom it may concern:*

Be it known that I, ZEONA Z. DUNCAN, a citizen of the United States, and a resident of Stanberry, in the county of Gentry and State of Missouri, have invented a new and useful Brake for Trucks, of which the following is a specification.

The present invention relates to wagon brakes, and particularly to a brake adapted for application to four wheeled trucks used in the short hauling of baggage and the like, such as are employed by baggage, express and other transportation companies.

The object of the present invention is to provide a brake for trucks which is adapted to normally maintain the front wheels locked when the truck is not in use, and to automatically release the wheels when the truck is in use; and which is automatically controlled by the movements of the tongue in raising the same out of the way dropping the tongue on the ground, or turning the tongue beneath the truck to lock front wheels when the truck is not in use, and in swinging the tongue into a position practically level with the front axle to release the wheels when it is desired to haul or otherwise manipulate the truck.

Briefly stated, this invention embodies a brake for a hand truck which normally applies the brake when the tongue is in any position except that in which it draws, pushes or turns the truck, and which when the tongue is in the latter position releases the brake and admits the free turning of the wheels.

The above and various other objects and advantages of this invention will be in part described, and in part understood, from the following detailed description of the present preferred embodiment, the same being illustrated in the accompanying drawings, wherein;

Figure 1 is a front elevation of a truck having the improved brake of this invention applied thereto, the tongue being removed.

Fig. 2 is a vertical longitudinal section through the forward end thereof, showing the brake applied to the front wheels.

Fig. 3 is a transverse section through the truck between its ends and looking forward to the brake as applied to the front wheels.

Fig. 4 is a fragmentary enlarged view of one of the front wheels, showing the brake drum and band applied thereto.

Fig. 5 is a detail perspective view of the operating lever employed.

Fig. 6 is a detail side elevation of one of the tongue brackets employed.

Referring to these drawings, A designates the body of a truck having a fifth wheel B, a lower bolster C connected to the fifth wheel B, an axle D and front steering road wheels E on the ends of the axle.

Each wheel E has a brake drum 10 on its inner side, and each drum is surrounded by a brake band 11 held to the drum 10 by headed screws 12 or the like. The bands 11 each have their ends connected to the opposite extremities of a rocking arm 13, a link 14 being interposed in the connection at one end of the arm. The arms 13 are connected rigidly at their intermediate portions to the opposite ends of a transverse brake rod 15 which is journaled in spaced apart bearings or straps 16 mounted on the rear side of the bolster C.

A rocking lever 17 is fixed between its ends to an intermediate portion of the rod 15, and has its lower end bent rearward to form a guide or support 18.

A pivot bracket 19 is mounted on the front side of the bolster C and pivotally supports an operating lever 20 connected between its ends thereto. The lever 20 has its lower end bent forward to form a nose 21.

The upper ends of the levers 17 and 20 are pivotally connected together by a pair of links 22 extending across the upper edge of the bolster C and spaced under the fifth wheel B.

Bracket arms 23 are mounted on and extend forwardly from the axle D near the ends thereof, and also near the intermediate portion of the axle, and carry a transverse tongue rod 24 upon which is pivotally mounted a tongue 25. The tongue 25 is mounted on the rod 24 between the intermediate pair of bracket arms 23 and projects rearwardly from the rod 24 a short distance and has thereat an enlarged cam head 26 lying in the path of the nose 21 of the operating lever. The cam 26 has a flat rear side or face 27 which frees the nose 21 when the tongue is extended in a horizontal plane toward axle D, such as shown in Fig. 2.

Bracket arms 28 depend from the forward ends of the intermediate brackets 23 and carry a transverse pin 29 to which the forward ends of springs 30 are secured, the springs extending beneath the axle D and are connected to the ends of a transverse pin 33 carried by a slide 31 on the guide or support 18 of the rocking lever 17. The springs 30 are always under tension to urge the lower end of the lever 17 forward and rock the arms 13 in a direction to bind the bands 11 about the drums 10.

The links 14 have turnbuckles 34 therein to vary the lengths of the links and adjust the bands about the springs 10. The springs 30 are spaced apart to admit the free swinging downward of the cam head 26 therebetween when the tongue is raised.

When the tongue 25 is dropped to the ground, the cam 26 rises above the nose 21 and slides around the lower shoulder 33'; admitting the upper ends of the levers 17 and 20 to be drawn backward by the springs 30. This movement of the levers rocks the arms 13 and causes the brake bands 11 to grip around the drums 10.

When the tongue 25 is raised the cam head rises over the nose and depresses the same backward, and maintains the nose in this position until the tongue 25 is raised into a high position near the hook 32. When the tongue is in this latter raised position the cam head passes down between the springs 30 and beneath the nose 21; admitting the springs 30 to apply the brakes.

However, when the tongue 25 is in any one of its intermediate positions, such as is assumed when the truck is being drawn or pushed, the flat advanced face 27 of the cam 26 depresses the nose 21 and swings the levers 17 and 20, against the tension of the springs 30, into a position to release the brake bands 11 from the drums 10.

The action of the brake is thus automatic, and controlled by the position of the tongue 25 to apply the brake when the tongue is in a position of rest, and to release the brake when the tongue is used in manipulating the truck.

It will be noted that the levers 17 and 20, and all other parts of this brake are located beneath the fifth wheel B and do not interfere with the free turning of the truck, and hold it in a position of rest when the front axle is in any angular position relatively to the longitudinal axis of the truck.

It is of course understood, that various changes and modifications may be made in the details of construction and design of the above specifically described embodiment of this invention, without departing from the spirit thereof, such changes and modifications being restricted only by the scope of the following claims.

What is claimed is:

1. In a brake, the combination with a truck having a bolster and wheels supported at opposite ends of the bolster, of brake drums mounted on the wheels, bands surrounding the drums, a brake rod journaled on the bolster and provided on opposite ends with rocker arms pivotally connected to the bands, a rocking lever mounted on the brake rod, springs mounted on the bolster and having connection with said lever to normally urge it to swing in one direction for binding the bands about the drums, an operating lever pivoted upon the bolster and having connection with the rocking lever and adapted to be normally held in one position thereby, and a tongue pivotally mounted on the axle and having a cam head with a flat face at its inner end adapted to clear the operating lever when the tongue is in a position of rest and adapted to depress it when the tongue is in operative position for releasing the bands on the drums against the tension of said spring.

2. In a brake, the combination with a truck having a bolster and wheels supported at opposite ends of the bolster, of brake drums mounted on the wheels, bands surrounding said drums, a brake rod journaled at the rear of the bolster and provided at opposite ends with rocker arms pivotally connected to the bands, a rocking lever mounted on the brake rod and extending to the rear of said bolster, yieldable means whereby said rocking lever may be urged to swing in one direction for binding the bands about the drums, an operating lever pivoted upon the bolster and arranged forwardly thereof, means rigidly connecting said operating lever with the rocking lever, a tongue on the truck, and means controlled by said tongue for swinging said operating lever and consequently turning said rocking lever in a direction to release the brake bands when the tongue is in an operative position for drawing the truck, but adapted to release the operating and connected rocking levers to the action of said yieldable means when the tongue is in an inoperative position whereby the brake bands may be tightened on said drums.

3. In a brake, the combination with a truck having a bolster and wheels supported at opposite ends of the bolster, of brake means, a brake rod supported from said bolster and having connection to operate said brake means, a rocking lever fast on said rod and extending in rear of the bolster, an operating lever journaled forward of said bolster, rigid means connecting said operating and rocking levers, yieldable means whereby the levers may be swung in one direction to cause the rocking of said brake rod and the application of the brake means, a tongue on the truck, and means controlled by the tongue for actuating said operating lever when the tongue is in an operative position to draw the truck whereby the levers may be swung in opposition to said yieldable means to release said brake means, but adapted to disengage said operating lever when the tongue is moved to an inoperative position whereby the yieldable means may cause the brake means to be applied.

4. In a brake, the combination with a truck having a bolster with wheels on opposite ends thereof and drums on the wheels, a brake band on the drums, levers pivoted at opposite sides of the bolsters, connections between one of the levers and the brake bands, a spring normally urging said levers in one direction for tightening the bands, a connection between the levers, and a tongue on the truck having a cam on its inner end adapted when the tongue is in operative position to engage the other lever for moving the levers against the tension of the spring to release the brake bands, and adapted when in inoperative position to free the levers for application of the brake under the tension of said spring.

ZEONA ZEXTER DUNCAN.